Nov. 25, 1969     C. G. SIMONS     3,480,038

PULSATOR UNIT FOR MILKING MACHINE

Filed Feb. 1, 1965     2 Sheets-Sheet 1

INVENTOR.
CLIFFORD G. SIMONS
BY
Andrus & Starke
ATTORNEYS

Nov. 25, 1969 C. G. SIMONS 3,480,038
PULSATOR UNIT FOR MILKING MACHINE
Filed Feb. 1, 1965 2 Sheets-Sheet 2

INVENTOR.
CLIFFORD G. SIMONS
BY
Andrus & Starke
ATTORNEYS

United States Patent Office 3,480,038
Patented Nov. 25, 1969

3,480,038
PULSATOR UNIT FOR MILKING MACHINE
Clifford G. Simons, Delavan, Wis., assignor, by mesne assignments, to Sta-Rite Industries, Inc., Delavan, Wis., a corporation of Wisconsin
Filed Feb. 1, 1965, Ser. No. 429,279
Int. Cl. A01j 5/14; F16k 31/04
U.S. Cl. 137—550                                6 Claims

ABSTRACT OF THE DISCLOSURE

The invention relates to a portable pulsator unit to be associated with a milking machine. The pulsator unit includes a casing which houses a motor that acts to drive a rotary valve assembly to alternately connect the milking machine to vacuum and atmospheric pressure.

---

The pulsator unit is adapted to be connected to a vacuum line through an adapter having a passage closed off by a valve. The pulsator unit includes a projecting tubular member connected to the rotary valve assembly and as the tubular member is engaged with the adapter, the end of the tubular member unseats the valve to open the vacuum line and simultaneously, electrical connections are made between power lines on the adapter and the motor of the pulsator unit.

The invention relates to a portable pulsator unit that alternately connects a milking machine to vacuum and atmospheric pressure. The electrical contacts are made before the vacuum is established in the unit.

The present invention is directed to an alternating current operated pulsator which is an individual type, associated with each milker, as opposed to a master type. More specifically, the pulsator includes a casing or housing which is mounted on the vacuum line and houses an alternating current motor and a speed-reducing transmission. The output drive shaft from the transmission is connected to a rotary valve member which rotates on a valve disc. The valve and valve disc have ports or openings which are connected to a source of vacuum and atmospheric pressure. As the valve rotates the various ports are brought into communication to thereby alternately connect the milking machine to vacuum and atmospheric pressure.

The pulsator is mounted on the vacuum line and is connected to the source of vacuum through a hollow platform or adapter. One of the valve ports in the valve disc communicates with a tubular member which extends outwardly from the pulsator housing and the tubular member is adapted to be inserted within an opening in the adapter. As the tubular member is inserted within the adapter, the end of the tubular member simultaneously opens a valve to the vacuum line so that vacuum will be drawn through the tubular member to the pulsator valve mechanism.

Air is supplied to the rotary valve mechanism through a series of openings in the outer end of the pulsator housing which are enclosed by a filter. The air passing through the housing not only is utilized for the pulsing action but also flows across the outer surface of the motor to cool the motor.

As an added feature, the electrical connection to the motor is automatically made by the engagement of the pulsator with the adapter or platform. The pulsator is provided with a pair of connectors which are connected to the motor, and as the tubular member is inserted within the opening in the adapter, the electrodes are wedged within contact clips on the adapter, which are connected to a source of power, so that electrical contact is made without any auxiliary connectors. The electrodes are positioned so that the electrical contact is made before the valve to the vacuum line is unseated so that the motor will start operating with a minimum load.

The present alternating current operated pulsating unit eliminates the relatively expensive rectifier which is required in the conventional direct current type of pulsator. As an additional advantage, the alternating current motor does not require a ground, and this is particularly important when the vacuum line is formed of plastic, glass or other non-conducting materials.

The rotary valve member is driven continuously in one direction and provides side-by-side pulsation, although it can be modified to pulse all four inflations at one time.

As a continuously operating, alternating current motor is employed with each individual milker, there is no dissipation of the electrical signal along extended lines, as in the conventional pulsating unit.

As an added advantage, the pulse ratio of the pulsator can be conveniently varied by merely replacing the rotating valve and/or the valve disc with other valves or discs having different valve port arrangements.

Furthermore, as the pulsating unit is mounted on the vacuum line, there are no electrical lines running to the milking machine, which is attached to the cow. This differs from the conventional unit in which electrical leads run to the pulsator which is normally mounted on the milk bucket. As electrical lines to the cow are eliminated, there is no danger of injury or electrocution of the cow due to a short in the circuit.

Other objects and advantages will appear in the course of the following description:

The drawings illustrate the best mode presently contemplated of carrying out the invention.

Figure 1:
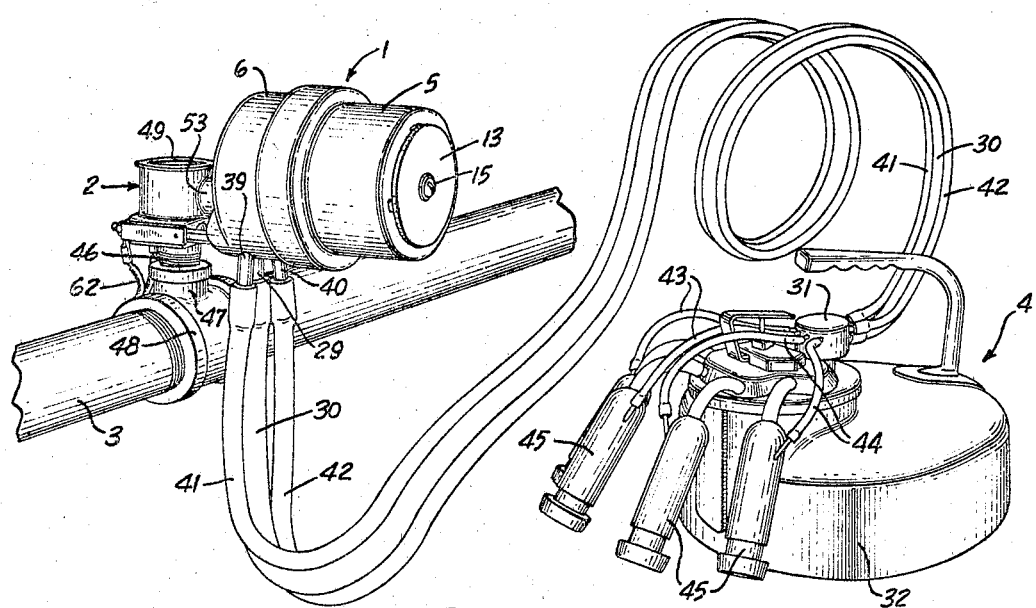
FIG. 1 is a perspective view of a milking system employing the pulsator unit of the invention.

The drawings illustrate a pulsator 1 mounted on an adapter 2 which is supported by the vacuum pipe line 3. The pulsator 1 is connected to a conventional milking machine 4 and serves to alternately apply vacuum and atmospheric pressure to the inflations to provide the pulsating milking action.

The pulsator 1 includes a plastic casing 5 which is secured to a base 6 by a series of screws 7. An alternating current motor 8 is located with the casing 5 and is operably connected to a speed-reducing transmission 9. The motor and transmission 9 are an integral unit and are spaced from the wall of the casing 5 by the connection of the brackets 10 with the screws 7.

The outer end of the casing 5 is provided with a central recess 11 and an air filter 12 is located within the recess. The air filter can be made out of cloth, paper or plastic material, such as polyurethane foam, and is held in place by a backing member 13. The peripheral edge or margin of the disc 13 bears against a series of circumferentially spaced projections 14 which extend outwardly from the end of the casing 5. The spaces between the projections 14 serve as passages for air moving into and through the filter 12. The filter 12 and backing disc 13 are retained in position within the recess 11 by a screw 15 which is threaded within an opening in the casing 5.

The recess 11 of the casing 5 is provided with a series of holes 16 so that the air passing through the filter 12 can then pass into the interior of the casing and around the motor 8 and transmission 9. Air flow within the annular space surrounding the motor 8 serves to cool the motor during its operation.

The output drive shaft 17 of the transmission 9 carries a rotary valve 18 which rotates against a wear plate 19 secured to the outer surface of a valve disc 20. The wear plate 19 is preferably formed of an anti-frictional material, such as Teflon, nylon or the like, so that lubrication of the contacting surfaces is not required.

The wear plate 19 and disc 20 are secured within the base 6 by a series of screws 21.

Figure 4:
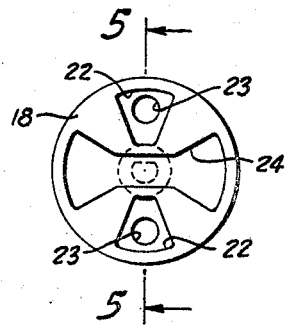
FIG. 4 is a transverse section taken along line 4—4 of FIG. 2.
Figure 5:
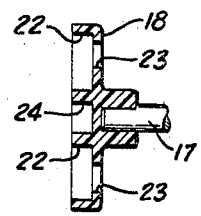
FIG. 5 is a section taken along line 5—5 of FIG. 4.

As best shown in FIGS. 4 and 5, the valve 18 is provided with a pair of opposite recesses 22 and air inlet holes 23 provide communication between the recesses 22 and the interior of the casing 5.

In addition to the recesses 22, the valve 18 is also provided with an elongated bone-shaped recess 24, and the ends of recess 24 are displaced approximately 90° from the recesses 22.

Both the wear plate 19 and the disc 20 are provided with aligned central openings 25 which communicate with a passage 26 formed in the base 6. A tube 27 is secured within passage 26 and is adapted to be connected to a source of vacuum, as will be hereinafter described.

In addition, the base 6 is formed with a vertically extending passage 28 which communicates with the passage 26 and tube 27 so that a vacuum will be continually drawn in the passage 28. A nipple 29 is secured within the passage 28 and the nipple is connected by a hose 30 to a manifold 31 mounted on the milk-receiving bucket 32. With the connection through hose 30, a vacuum will be continuously drawn in the bucket 32.

Figure 3:
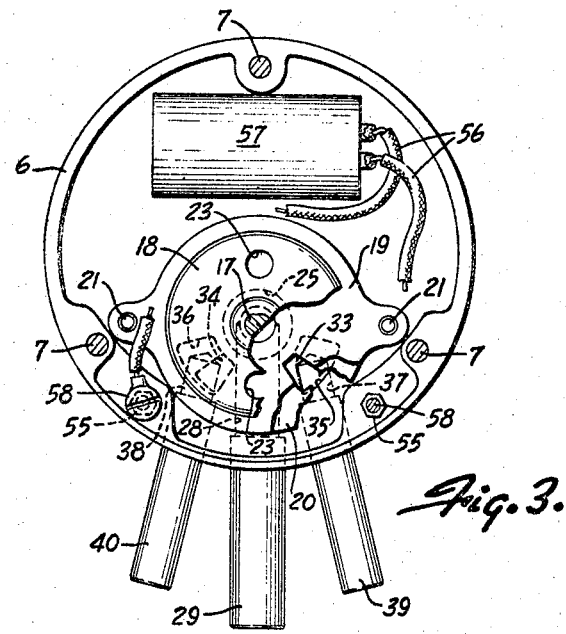
FIG. 3 is a transverse section taken along lines 3—3 of FIG. 2.

As best shown in FIG. 3, the wear plate 19 and valve disc 20 are bonded together and are provided with a pair of ports 33 and 34 which are disposed in alignment with ports 35 and 36 formed in the base 6. The ports 35 and 36 in base 6 have a larger circumferential dimension or arc than the ports 33 and 34, and thus by changing the valve disc 20 to a second disc having different port locations, the pulsating action can be varied.

The ports 33 and 35 communicate with an L-shaped passage 37 formed in the base 6, while the ports 34 and 36 communicate with a similar L-shaped passage 38. Nipples 39 and 40 are secured within passages 37 and 38, respectively.

Hoses 41 and 42 connect the nipples 39 and 40 to the manifold 31, and the manifold 31 establishes communication between one of the hoses 41 and a pair of tubes 43 which lead to a pair of inflations 45. Similarly, the manifold provides communication between hose 42 and a pair of tubes 44 which are connected to a second pair of inflations 45.

As the valve 18 continuously rotates in one direction the air supply recesses 22 and the vacuum supply recess 24 will be alternately brought into communication with the ports 33 and 34 in the wear plate. When one of the air supply recesses 22 communicates with the port 33, atmospheric pressure will be applied through port 33 and the hose 41 to the corresponding inflations 45. As the valve continues rotation, the air supply recess 22 will move out of engagement with port 33 and vacuum supply recess 24 will rotate into communication with port 33. A vacuum will be drawn through opening 25, recess 24, port 33, passage 37 and hose 41 to contract the corresponding inflations 45. Similarly, when each air supply recess 22 is in communication with the port 34, air will then be supplied through hose 42 to relieve the corresponding inflations and when the vacuum recess 24 is in communication with the port 34, vacuum will be drawn through the hoses 42 to thereby contract the corresponding inflations 45.

The vacuum is supplied to the pulsator from the vacuum line 3 through adapter 2. As best shown in FIG. 1, the lower end 46 of the adapter is threaded and is engaged within a boss 47 which extends upwardly from the coupling 48 in the vacuum line. The adapter 2 is provided with a cup-like shape having an open top enclosed by a plastic cap 49. The lower surface 50 of the adapter is sloped toward the central opening 51 in the adapter and defines a valve seat which supports a ball valve 52. Normally, the ball valve will be positioned centrally on the seat 50 to thereby close off the opening 51 to the vacuum line 3.

Figure 2:
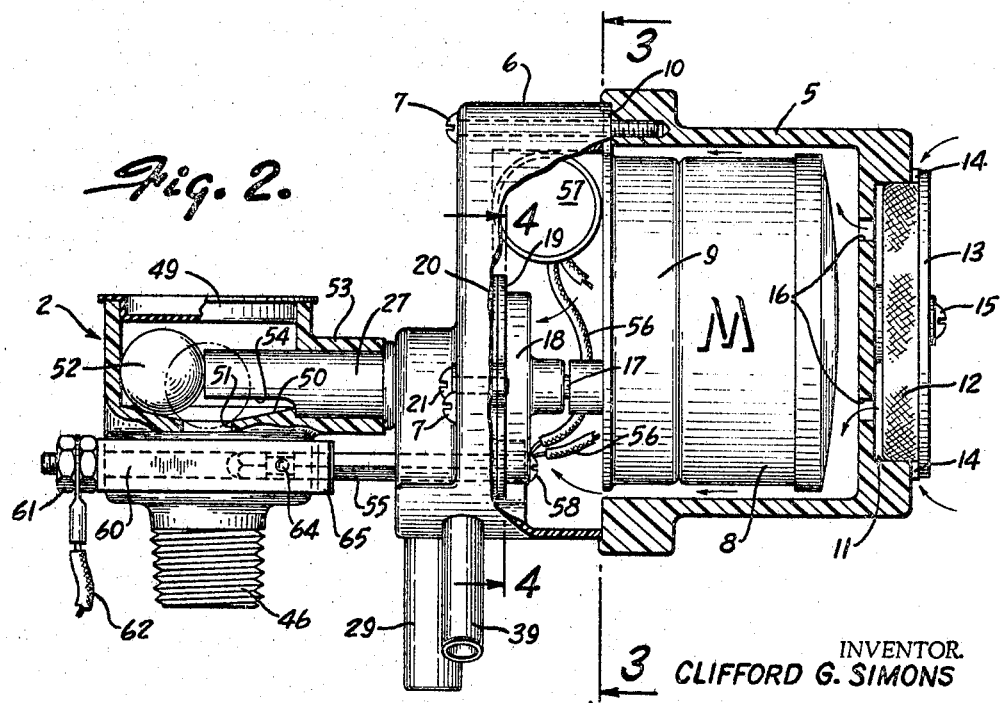
FIG. 2 is a side elevation with parts broken away in section showing the pulsator unit and adapter.

The body of adapter 2 is provided with a sleeve or nipple 53 which extends outwardly and the tube 27 is slidably received within the sleeve 53. The lower portion of the outer end of the tube 27 is recessed, as indicated by 54. When the tube 27 is inserted within the sleeve 53, the outer end of the tube will engage and unseat the ball valve 52 which closes off the opening 51. Vacuum will then be drawn through the adapter 2 and tube 27 to the pulsator 1. The recessed or cutaway portion 54 of the tube 27 insures that air will flow through the tube to opening 25 when the ball 52 is unseated, as shown in FIG. 2.

To provide an electrical connection for the motor 8, a pair of electrodes or connectors 55 extend outwardly from the base 6 and are generally parallel to the tube 27. The electrodes 55 are molded in the plastic non-conductive base 6 and the inner ends of the electrodes 55 are connected to lead wires 56 which are connected to the motor 8 and capacitor 57. The lead wires 56 are secured to the ends of the electrodes 55 by screws 58.

Figure 6:
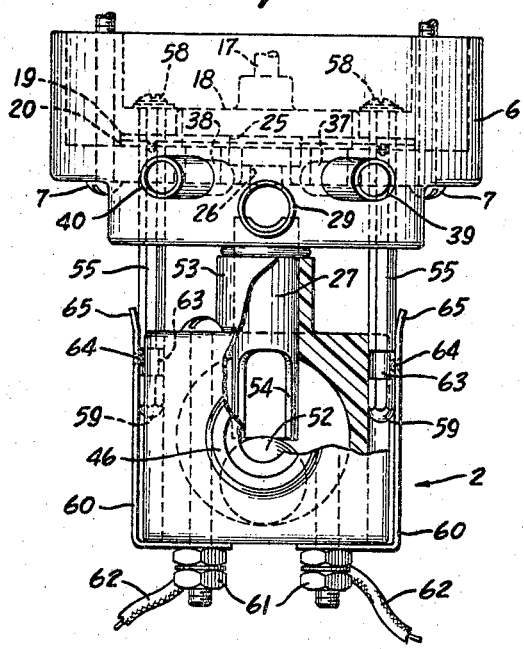
FIG. 6 is a view taken along line 6—6 of FIG. 2.
Figure 7:
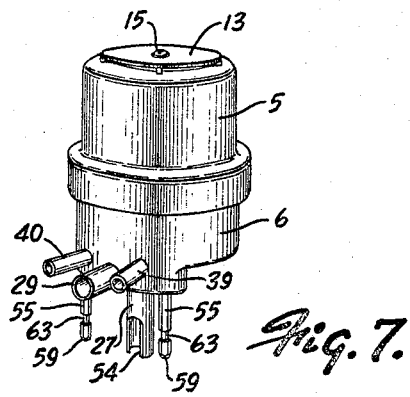
FIG. 7 is a perspective view of the pulsator.

The outer ends of the electrodes 55 are provided with rounded tips 59 and each electrode is wedged between the outer surface of the adapter 2 and a leaf spring contact 60. The contacts 60 are generally L-shaped, as shown in FIG. 6, and the ends of the contacts are connected to terminals 61. Leads 62 connect terminals 61 to a suitable source of alternating current power.

The resiliency of the contacts 60 will normally urge the contacts into tight bearing relation with the outer wall of the adapter 2. When the tube 27 is inserted within the nipple 53 to establish the vacuum connection, the electrodes 55 are simultaneously inserted or wedged between the contacts 60 and the adapter wall to provide the electrical connection to the motor 8.

To prevent accidental displacement of the pulsator 1 from the adapter 2, the electrodes 55 are provided with circumferential notches or grooves 63 which receive detents 64 formed in the contact 60. Engagement of the detents 64 with the notches 63 serves to maintain the pulsator in position on the adapter. In addition, the outer ends 65 of the contacts 60 are curved outwardly from the adapter so that the ends 65 will not be engaged by the electrodes as the electrodes are inserted within the contacts 60.

The electrodes 55 are positioned or arranged with respect to the tube 27 so that the electrical connection to the motor will be made before the ball valve 52 is unseated. Thus, the tips 59 of the electrodes 55 project from the base 6 a distance such that the electrodes will engage the contacts 60 before the tip of the tube 27 unseats the ball valve 52. This insures that the motor will start under minimum load conditions. As previously mentioned, once the electrical contact is made between the electrodes 55 and the contact 60, the motor will operate continuously until the pulsator unit is withdrawn from the adapter or platform 2.

It is contemplated that a series of the adapters 2 can be located along and the entire length of the vacuum line within the barn or milking parlor. The usual dairy farm will have only a few milking units and each milking unit, having the pulsator unit 1 attached, will be moved from adapter to adapter as the milking progresses from cow to cow in the barn. For example, after milking a given cow, the pulsator 1 will be removed from the adapter 2 and moved to another adapter adjacent the next cow to be milked. This operation is repeated as the milking progresses throughout the barn.

The pulsator 1 can be conveniently connected to the vacuum line 3 by merely inserting the tube 27 into the adapter. The insertion of tube 27 automatically opens the vacuum line and similarly, the engagement of the electrodes 55 with the contacts 60 automatically starts the motor. When the pulsator unit is withdrawn, the electrical contact to the motor is broken and similarly the ball valve 52 will fall back on the seat 50 to close the vacuum line. Thus, the unit of the invention not only establishes and breaks the vacuum, but also establishes and breaks the electrical contact to the motor automatically without the use of any auxiliary valves, connectors or the like.

By using an alternating current, 24 volt motor, the pulsator unit eliminates the relatively high cost of a rectifier which is necessary in a direct current circuit. As an added advantage, the pulsator can be used without a ground when using pipes made of electrically non-conductive material, such as plastic or glass.

By using a constant direction driving means in combination with the rotary valve, it is possible, by merely changing the valve ports, to obtain both side-by-side pulsation as well as to pulse all four inflations at the same time. Moreover, the pulsing ratios can be conveniently varied by merely changing the valve, or valve disc, or both.

As the motor is located immediately adjacent the integral part of the pulsator unit and directly drives the rotary valve, there is no dissipation of an electrical signal due to an extended electrical line, as in the conventional DC pulsator. Moreover, no electrical lines lead to the milking unit itself, but only to the pulsator which is positioned on the vacuum line, and this feature eliminates any possibility of injury or electrocution of the cow due to an electrical malfunction.

I claim:
1. In a milking system, a vacuum line, an adapter mounted on the vacuum line and having a passage disposed in communication with said vacuum line, valve means for opening and closing said passage, said adapter including contact means connected to a source of electrical energy, portable pulsator means including motor driven valve means for alternately supplying vacuum and atmospheric pressure to a milking machine, said pulsating means being removably mounted on said adapter, vacuum connecting means for automatically opening said valve means to establish vacuum to said pulsator means when the pulsator means is mounted on said adapter means, and electrical connecting means for automatically establishing an electrical connection between said motor and said contact means when said pulsator means is mounted on said adapter, said electrical connecting means being disposed to make electrical contact and start the motor before said vacuum connecting means establishes a vacuum to said pulsator means, whereby the starting load on the motor is minimized.

2. The structure of claim 1 in which said contact means comprises contacts disposed on opposite surfaces of the adapter and each contact is biased toward the corresponding surface of said adapter.

3. In a milking system, a vacuum line, an adapter mounted on the vacuum line, conduit means providing communication between the interior of the adapter and the vacuum line and defining a valve seat, ball valve means located in said conduit means and engageable with valve seat for opening and closing said first conduit means, said ball valve means being freely movable in a lateral direction with respect to the axis of the valve seat, pulsator means for alternately supplying vacuum and atmospheric pressure to a milking machine and having a housing, a tubular member communicating with said pulsator means and extending outwardly from the housing, said tubular member being received within said conduit means and having a length sufficient to engage and laterally unseat said ball valve means to thereby establish a vacuum to said pulsator means.

4. The structure of claim 3, wherein said conduit means also including means for preventing complete lateral displacement of said ball valve from said valve seat.

5. The structure of claim 2, wherein said vacuum connecting means and said contacts are disposed in generally triangular relationship.

6. The structure of claim 1, wherein said pulsator means comprises a housing and a motor mounted in the houseing and having an output drive shaft operably connected to said valve means, said valve means including an air inlet port communicating with the interior of the housing, said housing being spaced outwardly of said motor to provide an annular clearance therearound, said housing including an inlet opening located on the opposite side of the motor from said valve means, and a filter disposed across the inlet opening for filtering air passing through said opening, said air circulating through said annular clearance and being supplied through said inlet port to said valve means.

References Cited
UNITED STATES PATENTS 3,172,391  3/1965  Norton _____ 119—14.01

FOREIGN PATENTS 629,746  9/1949  Great Britain.

WILLIAM F. O'DEA, Primary Examiner

H. N. COHN, Assistant Examiner

U.S. Cl. X.R.

119—14.01, 14.41; 137—624.13, 625.21; 200—61.86